United States Patent Office 3,369,911
Patented Feb. 20, 1968

3,369,911
SAUSAGE CASING
Job Wilhelm von Witzleben, Walsrode-Bomlitz, Germany, assignor to Wolff & Co. A.G., Walsrode-Bomlitz, Germany
No Drawing. Filed May 18, 1964, Ser. No. 368,338
Claims priority, application Germany, May 22, 1963, W 34,550
1 Claim. (Cl. 99—176)

This invention relates to improvements in sausage casings and method of making same. Synthetic sausage casings which are on the market—more particularly those with a cellulose base, such as cellulose hydrate casings, and the so-called fibre casings, that is to say casings made of long-fibred paper impregnated and/or coated with cellulose hydrate—have the disadvantage that the sausage meat, owing to the fairly high permeability to water vapour of these casings, particularly in the edge zones, dries out, so that not only do the casings become wrinkled and therefore unattractive, but the sausage also has its flavor spoiled and loses weight.

To avoid these drawbacks, it has already been proposed that the ready-filled sausage should be given an outer covering of a substance impermeable to water vapour, on a vinyllidene chloride resin base. Another known method is to provide sausage casings consisting partly or wholly of cellulose hydrate with a film-forming vinyllidene polymerisate, to reduce their permeability to water vapour.

Casings prepared by this method, however, have only a small shrinkage, because the inner layer of cellulose hydrate or fibre remains swollen by the water-containing sausage meat. Besides this, the casings have a very glossy surface, not resembling the natural casing.

Contrary to this known state of the art, it has been found that a synthetic casing comprised of an outer carrier layer which may be textured or textureless and provided with a seamless inner coating with a reduced permeability to water vapour and air, has none of the disadvantages described, but very largely fulfils all that can be required of a sausage casing. Thus, a sausage casing with an inner layer which is substantially impervious to water and air or has a gas permeability lower than the outer layer provides a casing which has none of the above drawbacks.

Because the coating which is relatively impermeable to water vapour and air is on the inside, the outer carrier layer may be slightly dampened, but will dry out again after the production process, shrinking accordingly. It is only then that certain kinds of sausages take on a plump, attractive shape.

The outer carrier layer with or without texture, should preferably consist of cellulose hydrate, cellulose ether, hydroxyethyl cellulose, methyl cellulose or carboxymethyl cellulose, or of structured substances such as, for example, long-fibred paper, woven fabric or the like, coated and/or impregnated with these compounds. The carrier layer may also be formed of albumen fibres, gelatine-soaked paper or woven fabric, plastics, paper or woven fabric impregnated with plastics, or similar conventional carriers. It may also take the form of a tube that is seamless or is produced by edge adhesion. The inner coating which reduces permeability to water vapour and air should preferably be formed from a vinyllidene chloride polymerizate, but it may also be formed from other coatings which reduce permeability to water vapour and air, such as plastics—polyolefine, for example—or lacquers, such as nitrocellulose lacquer, for example.

The inner layer may be prepared from a melt, a solution or a dispersion, though preference should be given to the dispersion, on account of ease of handling. It is an advantage for the inner layer to be fixed to the outer carrier layer by means of a bonding agent, such as melamine formaldehyde, urea formaldehyde or polyethylene amine.

A particularly simple and advantageous method of making the synthetic sausage casing according to the invention is to provide the tube in the form of a carrier layer, which may be textured or textureless, with a covering which reduces permeability to water vapour and air, in the conventional manner and using a bonding agent if desired, and then to turn it inside out.

The synthetic casing proposed in accordance with the invention has a matt appearance, resembling that of a natural casing, which makes it particularly suitable for use with fillings such as, for example, liver, thuringer or home-made sausage meat. The casing is practically impermeable to water vapour and air, takes smoke well and hence gives the sausage an appetising, natural appearance. Even after long storage, there is substantially no loss of weight. The flavor of the sausage remains unchanged and there is less tendency for the fat to turn rancid, since a high degree of protection against ultra-violet rays is given. Another point that should be emphasized is that the new casing is protection against boiling and cooking. Thus the sausage remains plump and cylindrical and does not develop wrinkles when cooling, because the casing has a natural capacity for shrinkage. The ligaturing that is sometimes needed with other casings is therefore entirely unnecessary. A further advantage of the new casing is its softness after watering and the ease of opening and pulling onto the filling tube, as a result of its smooth surface and its graspable exterior.

What is claimed is:
1. An improved casing for sausage, said casing consisting essentially of a shrinkable fibrous tubular outer layer having an inner surface, said outer layer being made of a material selected from the group consisting of cellulose hydrate, long-fibred paper coated with cellulose hydrate, longfibred paper impregnated with cellulose hydrate, hydroxy-ethyl cellulose, long-fibred paper coated with hydroxy-ethyl cellulose, long-fibred paper impregnated with hydroxy-ethyl cellulose, methyl-cellulose, long-fibred paper coated with methyl-cellulose, long-fibred paper impregnated with methyl-cellulose, carboxy methyl cellulose, long-fibred paper coated with carboxy methyl cellulose, long-fibred paper impregnated with carboxy methyl cellulose, albumen fibers, gelatine soaked paper, gelatine soaked woven fabric, paper impregnated with plastic, and woven fabric impregnated with plastics, and a seamless substantially water and air impervious inner layer bonded to said inner surface for intimate contact with the outer surface of said sausage, said inner layer being made of a material selected from the group consisting of vinylidine polymerisates, polyolefines, and nitro-cellulose lacquers whereby said inner layer protects sausage in the casing from drying and said outer layer shrinks upon drying to provide a sausage with a plump attractive shape.

References Cited

UNITED STATES PATENTS

| | | | |
|---|---|---|---|
| 1,978,774 | 10/1934 | Voss et al | 99—176 |
| 2,144,899 | 1/1939 | Smith | 99—176 X |
| 2,181,886 | 12/1939 | Goodman | 99—176 |
| 2,201,457 | 5/1940 | Smith et al. | 99—176 |
| 2,210,436 | 8/1940 | Weingand et al. | 99—176 |
| 2,686,744 | 8/1954 | Cornwell | 99—176 X |
| 2,961,323 | 11/1960 | Underwood et al. | 99—175 X |
| 3,037,868 | 6/1952 | Rosser | 99—176 X |
| 3,158,492 | 11/1964 | Firth | 99—176 |
| 3,224,885 | 12/1965 | Shiner | 99—176 |

HYMAN LORD, *Primary Examiner.*

A. LOUIS MONACELL, *Examiner.*